(12) United States Patent
Rochford

(10) Patent No.: US 7,917,180 B2
(45) Date of Patent: Mar. 29, 2011

(54) BUTTON WITH AN INCLUDED DISPLAY

(75) Inventor: Ciaran Thomas Rochford, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 11/538,322

(22) Filed: Oct. 3, 2006

(65) Prior Publication Data

US 2007/0293273 A1 Dec. 20, 2007

Related U.S. Application Data

(60) Provisional application No. 60/805,280, filed on Jun. 20, 2006.

(51) Int. Cl.
*H04B 1/38* (2006.01)

(52) U.S. Cl. ............ 455/566; 455/412.2; 455/425; 455/463; 455/575.3; 345/156; 345/1.2; 345/2.3

(58) Field of Classification Search .............. 455/566, 455/3.06, 403, 412.2, 425, 463, 556.1, 575.1, 455/575.3, 575.4; 345/156, 1.1–3.3; 340/825.25; 379/368

See application file for complete search history.

(56) References Cited

U.S. PATENT DOCUMENTS

| | | | | |
|---|---|---|---|---|
| 6,834,294 | B1* | 12/2004 | Katz | 709/203 |
| 7,010,293 | B2* | 3/2006 | Go | 455/414.3 |
| 2004/0077384 | A1* | 4/2004 | Makino et al. | 455/575.1 |
| 2004/0166829 | A1* | 8/2004 | Nakae et al. | 455/403 |
| 2005/0280731 | A1* | 12/2005 | Lee | 348/333.01 |
| 2006/0092038 | A1* | 5/2006 | Unger | 340/825.25 |
| 2007/0101004 | A1* | 5/2007 | Loen | 709/227 |

* cited by examiner

*Primary Examiner* — Matthew D Anderson
*Assistant Examiner* — Shaima Q Aminzay

(57) ABSTRACT

A mobile device is provided that includes a main display screen and at least one button that includes a secondary display screen. The disclosure also provides a method for providing information on a mobile device. The method includes providing a keypad on the mobile device including a display screen on at least one of the buttons on the keypad. The method also includes displaying the information on the display screen on the button.

20 Claims, 4 Drawing Sheets

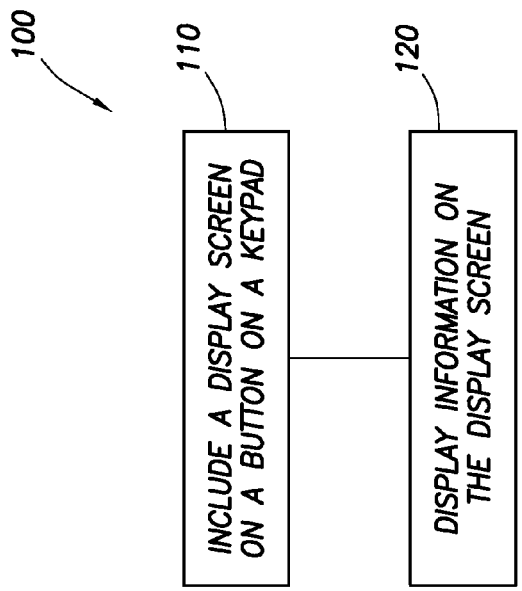
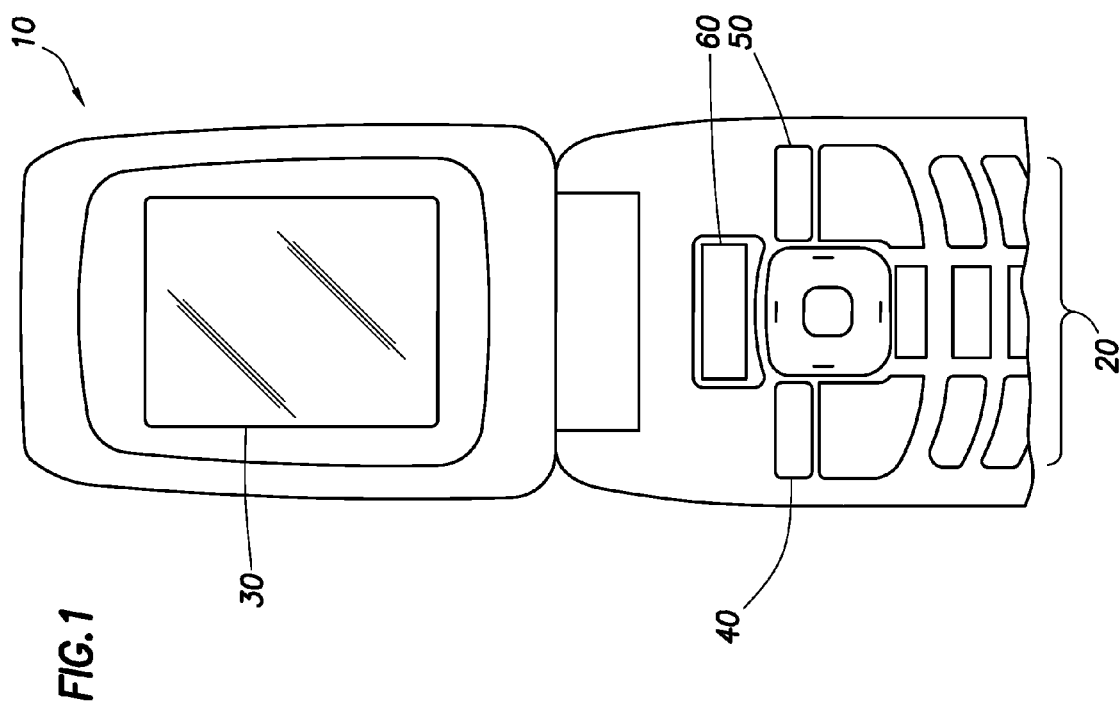

BUTTON WITH AN INCLUDED DISPLAY

CROSS-REFERENCE TO RELATED APPLICATIONS

This application claims priority to U.S. Provisional Patent Application No. 60/805,280, entitled "LCD Button", filed on Jun. 20, 2006, by Ciaran Thomas Rochford, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile electronic devices such as cellular phones, smart phones, personal digital assistants (PDAs), mobile gaming devices, handheld computers, and similar devices typically include a screen for displaying information and a keypad for entering information. Such devices will be referred to herein as handsets. The keypad on a handset might include one or more buttons that are labeled with characters or images that indicate the function that will be performed if a button is pressed.

The keypad might also include one or more 'soft' buttons. A soft button is a button that has no permanently assigned function but can perform different tasks depending on the context that is currently active on the handset. A soft button typically has no label on the button itself. Instead, the function that the soft button performs might be indicated by a label that appears above the soft button on the display screen. For example, the word 'menu' might appear in the lower left portion of the display screen directly above a soft button. Pressing the soft button might cause a menu to appear on the display screen. After the menu appears, a different word might appear in the position where the word 'menu' previously appeared. Pressing the soft button again might cause an action that is associated with this different word.

SUMMARY

In one embodiment, a mobile device is provided that includes a main display screen and at least one button that includes a secondary display screen.

In another embodiment, a method is disclosed for providing information on a mobile device. The method includes providing a keypad on the mobile device including a display screen on at least one of the buttons on the keypad. The method also includes displaying the information on the display screen on the button. In another embodiment, a method for providing information on a keypad of a mobile electronic handset is provided. The method consists of.

In still another embodiment, a display system is provided. The display system includes a display screen coupleable to a button on a keypad of a mobile device.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

FIG. 1 is a diagram of a handset according to an embodiment of the disclosure.

FIG. 2 illustrates a method for providing information on a keypad of a mobile electronic handset according to an embodiment of the disclosure.

DETAILED DESCRIPTION

Figure 3:
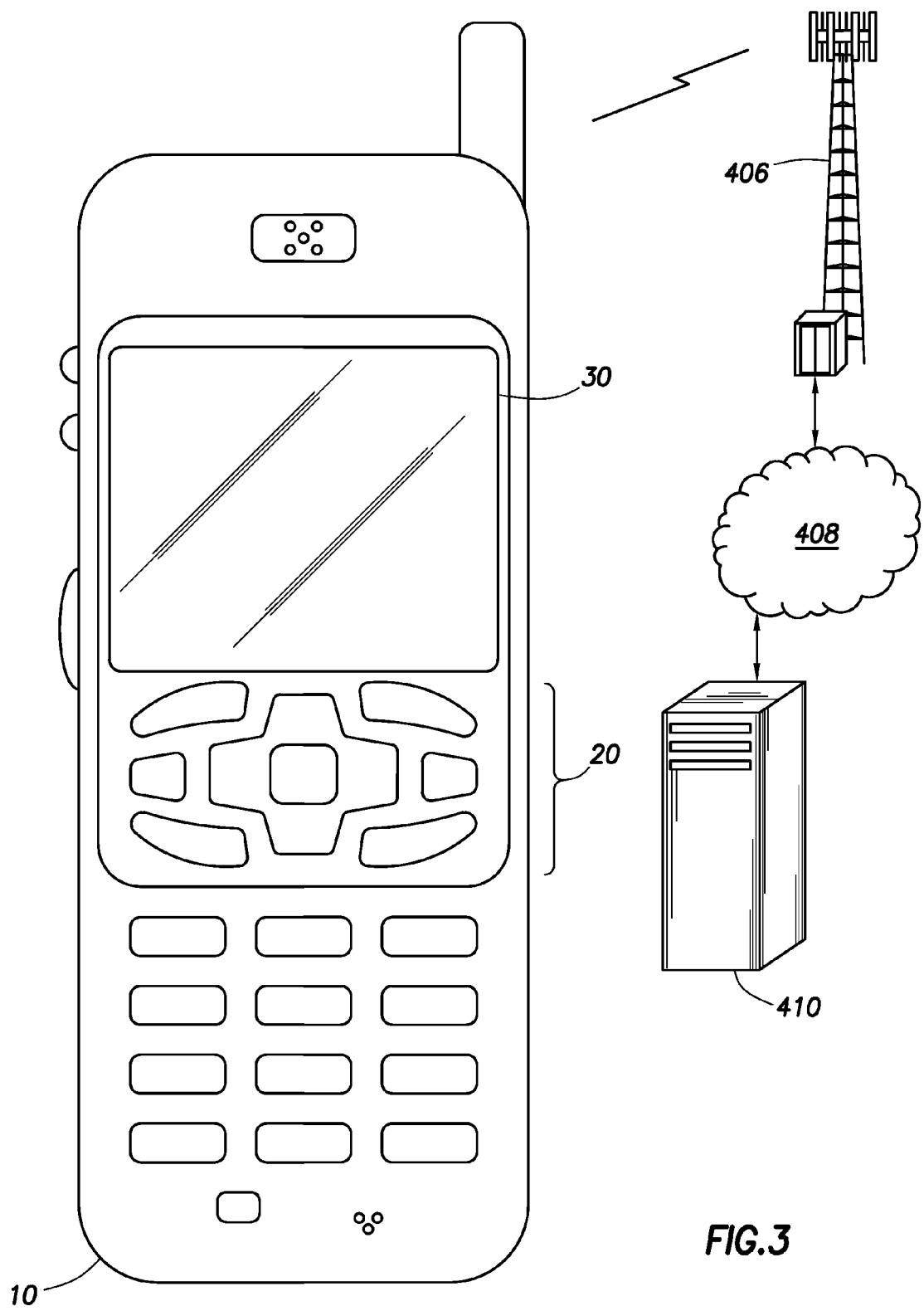
FIG. 3 is a diagram of a wireless communications system including a handset operable for some of the various embodiments of the disclosure.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein.

Embodiments of the disclosure provide a display screen on a button of a handset. In one embodiment, the display screen is a liquid crystal diode (LCD) screen, but in other embodiments any other type of display screen known in the art could be used, such as plasma screens. For ease of reference, the display screen will be referred to herein as an LCD screen, but it should be understood that the term 'LCD screen' might refer to other display technologies currently existing or developed in the future. Also, it should be understood that the term 'LCD screen', as used herein, refers only to a display screen that is present on a button. The display screen that is traditionally present on a handset and that is traditionally used to display telephone numbers, menus, icons, settings, photos, and other information will be referred to herein as the main screen. The LCD screen might also be referred to as a secondary display screen.

A handset button that includes an LCD screen will be referred to herein as an LCD button. Text, animation, or other graphical information could be displayed on an LCD button and this graphical information could be used for different purposes on different buttons and under different circumstances. In some embodiments, all of the buttons on a handset are LCD buttons. In other embodiments, only one or only a portion of the buttons on a handset are LCD buttons.

FIG. 1 illustrates an embodiment in which LCD buttons are used instead of the 'soft' buttons that have previously been used on some handsets. In this embodiment, a first LCD button 40 appears near the upper left portion of a keypad 20 of a handset 10 and a second LCD button 50 appears near the upper right portion of the keypad 20 of the handset 10. A main screen 30 can display information in a manner similar to that of a main screen on a traditional handset. LCD button 40 and LCD button 50 act in a manner similar to the actions of the soft buttons that might appear on a traditional handset. In this embodiment, the word 'menu' appears on the LCD screen of LCD button 40 and the word 'calendar' appears on the LCD screen of LCD button 50. Pressing LCD button 40, for example, might cause a menu to appear on the main screen 30. After the menu appears, a different word might be displayed on the LCD screen of LCD button 40. Pressing LCD button 40 while this different word is displayed on LCD button 40 might cause an action that is associated with this different word.

In this way, different labels can be displayed on LCD button 40 and LCD button 50 depending on the context currently active on the handset 10. This can provide a simpler user experience than the use of soft buttons. Instead of a user needing to look at a main screen to find a label that is currently associated with a soft button, the user can look directly at LCD button 40 or LCD button 50 to find the label for the function that currently applies to LCD button 40 or LCD button 50.

In other embodiments, the LCD screens on LCD button 40 and LCD button 50 could be used for purposes other than as a replacement for soft buttons. In still other embodiments, LCD button 40 and LCD button 50 could be used in place of soft buttons as described and one or more additional LCD buttons could be present on the keypad 20 of the handset 10 to provide additional functions. In the embodiment of FIG. 1, a third LCD button 60 is present on the handset 10. The following discussion will describe some possible functions that could be performed by the LCD button 60 but it should be understood that these functions could be performed by LCD button 40, LCD button 50, or some other LCD button not shown in FIG. 1.

In one embodiment, LCD button 60 might be used to display a logo of a handset distributor. A single manufacturer might manufacture handsets such as the handset 10 but multiple resellers might sell or otherwise distribute the handsets 10. Each of these resellers might wish to have its own logo displayed on the handset 10. By using an LCD button such as LCD button 60, the handset manufacturer can easily customize the handsets 10 for the different resellers. Instead of placing a different permanent label for each reseller on each handset 10, the manufacturer could simply cause different labels to appear on LCD button 60.

In an embodiment, when LCD button 60 displays a reseller's logo or other information related to a reseller, pressing LCD button 60 could cause an action associated with the reseller. For example, when the handset 10 is capable of connecting to the Internet, pressing LCD button 60 might cause a web page related to the reseller to appear on the main screen 30. Alternatively, pressing LCD button 60 might cause a telephone number for the reseller to be dialed. The handset manufacturer or the telecommunications service provider that provides service for the handset 10 might receive compensation from a reseller whenever LCD button 60 displays information related to the reseller and a user presses LCD button 60.

In other embodiments, LCD button 60 might display advertisements or other information for companies other than the reseller of the handset 10. Different information might appear depending on the current context of the handset 10 and/or on the preferences or other characteristics of the user of the handset 10. For example, if the user uses the handset 10 to go to a web site, LCD button 60 might display an advertisement related to the content of the web site. Pressing LCD button 60 might take the user to a different web site related to the advertisement. Alternatively, if the user launches an application on the handset 10, LCD button 60 might display an advertisement related to the application and pressing LCD button 60 might take the user to a web site related to the application.

In other embodiments, a random sequence of advertisements might appear on LCD button 60 or a sequence of advertisements based on the user's preferences or the user's current location might appear on LCD button 60. One of skill in the art will recognize other manners in which the information that appears on LCD button 60 might be determined and other actions related to that information that could occur when LCD button 60 is pressed. The handset manufacturer or the telecommunications service provider might receive compensation whenever LCD button 60 displays an advertisement and a user presses LCD button 60.

The information that appears on LCD button 60 might be a static text label or static image or might be dynamic text or a dynamic image. For example, text might scroll across LCD button 60 in the manner of a ticker or might fade in and out, flash, flicker, change color, or display other effects. An image might display movement in the manner of an animation or a video clip. Display of dynamic images might allow complex advertisements to be shown on LCD button 60.

For cost reduction purposes, it is assumed that in many embodiments only a small portion of the buttons on the keypad 20 will be LCD buttons. However, in other embodiments, it may be desirable for all or a substantial portion of the buttons to be LCD buttons. For example, a handset manufacturer could easily adapt the handset 10 for use with different languages with the use of LCD buttons. When manufacturing handsets 10 for a country that uses a particular alphabet or particular characters for its language, the manufacturer could cause the LCD buttons to display indicia that are appropriate for that language. When manufacturing handsets 10 for a different country that uses a different alphabet or different characters, the manufacturer could cause the LCD buttons to display indicia that are appropriate for that country's language. The same handsets 10 could be used in both cases with only minor modifications being made to cause different displays on the LCD buttons.

In another example, the handset 10 might include a complicated gaming application that requires the use of multiple different buttons to perform all of the different functions of the game. On a traditional handset, a game player might need to memorize which functions each button performs. On a handset 10 that includes LCD buttons, the LCD buttons could display labels that indicate which functions the LCD buttons perform. The labels might change as the game progresses and an LCD button performs different functions.

In yet another example, several adjacent LCD buttons could act in the manner of a single LCD screen. For instance, an image or character that might be too small to be recognizable if placed on a single LCD button might be enlarged and then divided into portions. Each portion could then be placed on a different LCD button in such a manner that when the LCD buttons are viewed simultaneously, the large version of the image or character is seen. Alternatively, a long text message that might be difficult to read if scrolled across a single LCD button might be scrolled across several adjacent LCD buttons so that a longer portion of the message can appear at one time.

One of skill in the art might recognize that some of the features described above might be provided by a touch screen that uses capacitive touch sensing, resistive touch sensing, ultrasonic surface wave touch sensing, or optical, heat, magnetic, or other types of touch sensing to detect that a portion of the touch screen has been touched. For example, a key that appears on a touch screen might change its appearance after being touched. However, a touch screen provides no tactile feedback that a key on the screen has been successfully pressed. An LCD button, on the other hand, physically moves some distance when pressed and can provide a 'click' feeling or some other tactile signal to a user that a press of the LCD button has been successfully accomplished.

When a user presses an LCD button, the information that appears on the LCD might change. For example, when the word 'menu' appears on LCD button 40 and a user presses LCD button 40, a different word might appear on LCD button 40 after the button press. In some cases, the user might leave a finger on top of LCD button 40 after having pressed it. In such a case, the user might not be aware that the label on LCD button 40 has changed and might not be aware of the new function that will be performed if LCD button 40 is pressed again. In various embodiments, LCD button 40 (or any other LCD button) can produce a signal when pressed to indicate that the label or other information that appears on LCD button 40 has changed.

In one embodiment, the signal might be a tactile signal such as a vibration. In another embodiment, the signal might be a visual signal such as a change of color. That is, after being pressed, the LCD button 40 might vibrate, change color, or provide some other indication that new information appears on the LCD button 40. This can remind the user to remove his or her finger from LCD button 40 in order to observe the new information on LCD button 40.

FIG. 2 illustrates a method 100 for providing information on a keypad of a mobile electronic handset. In box 110, a display screen is included on a button on the keypad. In box 120, the information is displayed on the display screen.

FIG. 3 shows a wireless communications system including the handset 10. The handset 10 is operable for implementing aspects of the disclosure, but the disclosure should not be limited to these implementations. Though illustrated as a mobile phone, the handset 10 may take various forms including a wireless handset, a pager, a personal digital assistant (PDA), a portable computer, a tablet computer, or a laptop computer. Many suitable devices 100 combine some or all of these functions. In some embodiments, the handset 10 is not a general purpose computing apparatus like a portable, laptop or tablet computer, but rather is a special-purpose communications apparatus such as a mobile phone, wireless handset, pager, or PDA.

The handset 10 includes the main screen 30 and the keys 20 for input by a user. The handset 10 may present options for the user to select, controls for the user to actuate, and/or cursors or other indicators for the user to direct. The handset 10 may further accept data entry from the user, including numbers to dial or various parameter values for configuring the operation of the handset 10. The handset 10 may further execute one or more software or firmware applications in response to user commands. These applications may configure the handset 10 to perform various customized functions in response to user interaction.

Among the various applications executable by the handset 10 are a web browser, which enables the main screen 30 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 10 has access to information on various servers, such as a server 410. The server 410 may provide content that may be shown on the display 30.

Figure 4:
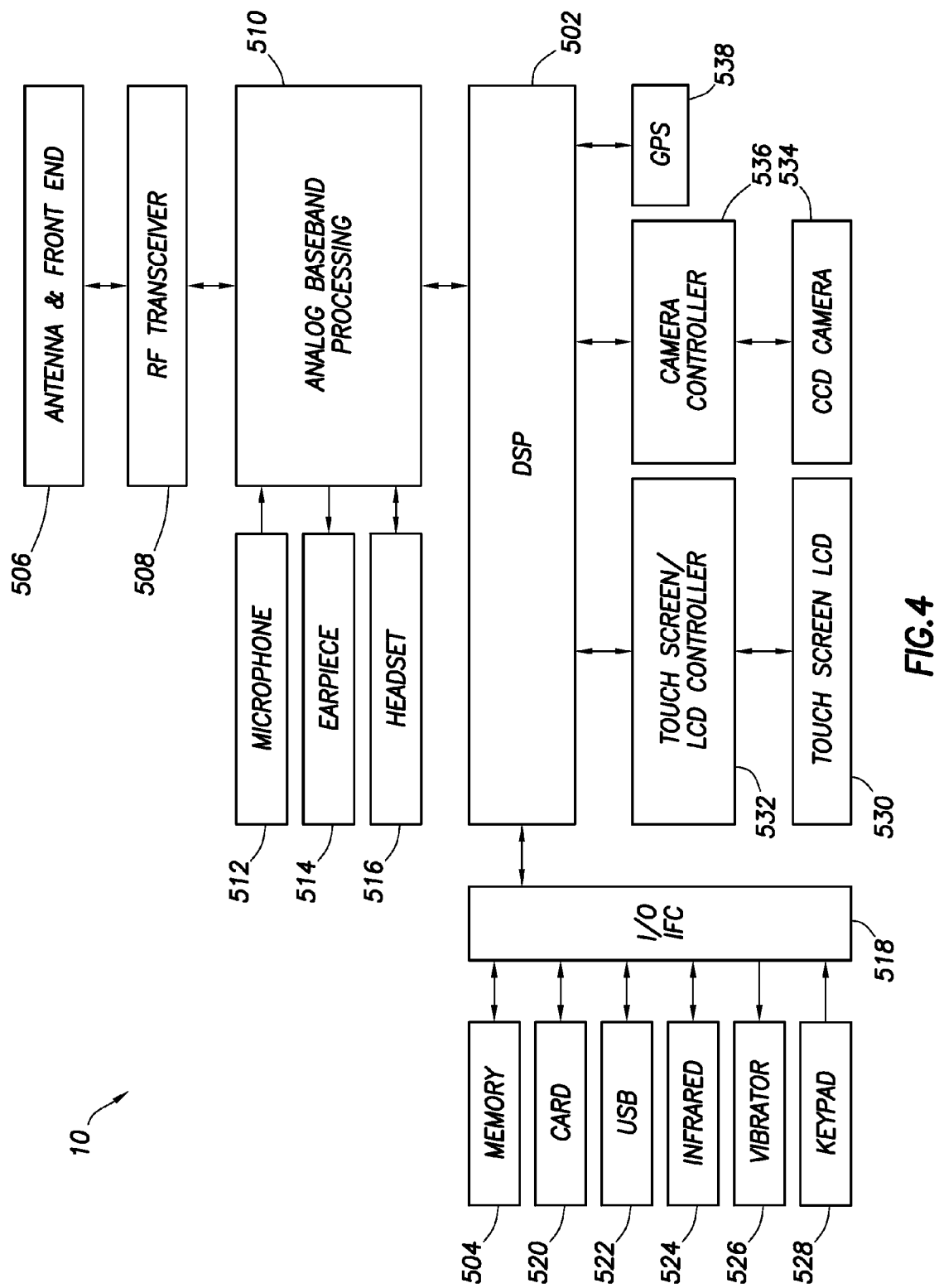
FIG. 4 is a block diagram of a handset operable for some of the various embodiments of the disclosure.

FIG. 4 shows a block diagram of the handset 10. The handset 10 includes a digital signal processor (DSP) 502 and a memory 504. As shown, the handset 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 10 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 10 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 10 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 10 to function as a peripheral device to exchange information with a personal computer or other computer system. The infrared port 524 and other optional ports such as a Bluetooth interface or an IEEE 802.11 compliant wireless interface may enable the handset 10 to communicate wirelessly with other nearby handsets and/or wireless base stations.

The input/output interface 518 may further connect the DSP 502 to the vibrator 526 that, when triggered, causes the handset 10 to vibrate. The vibrator 526 may serve as a mechanism for silently alerting the user to any of various events such as an incoming call, a new text message, or an appointment reminder.

The keypad 528 couples to the DSP 502 via the interface 518 to provide one mechanism for the user to make selections, enter information, and otherwise provide input to the handset 10. Another input mechanism may be the touch screen LCD 530, which may also display text and/or graphics to the user. The touch screen LCD controller 532 couples the DSP 502 to the touch screen LCD 530.

The CCD camera 534 enables the handset 10 to take digital pictures. The DSP 502 communicates with the CCD camera 534 via the camera controller 536. The GPS sensor 538 is coupled to the DSP 502 to decode global positioning system signals, thereby enabling the handset 10 to determine its position. Various other peripherals may also be included to provide additional functions, e.g., radio and television reception.

Figure 5:
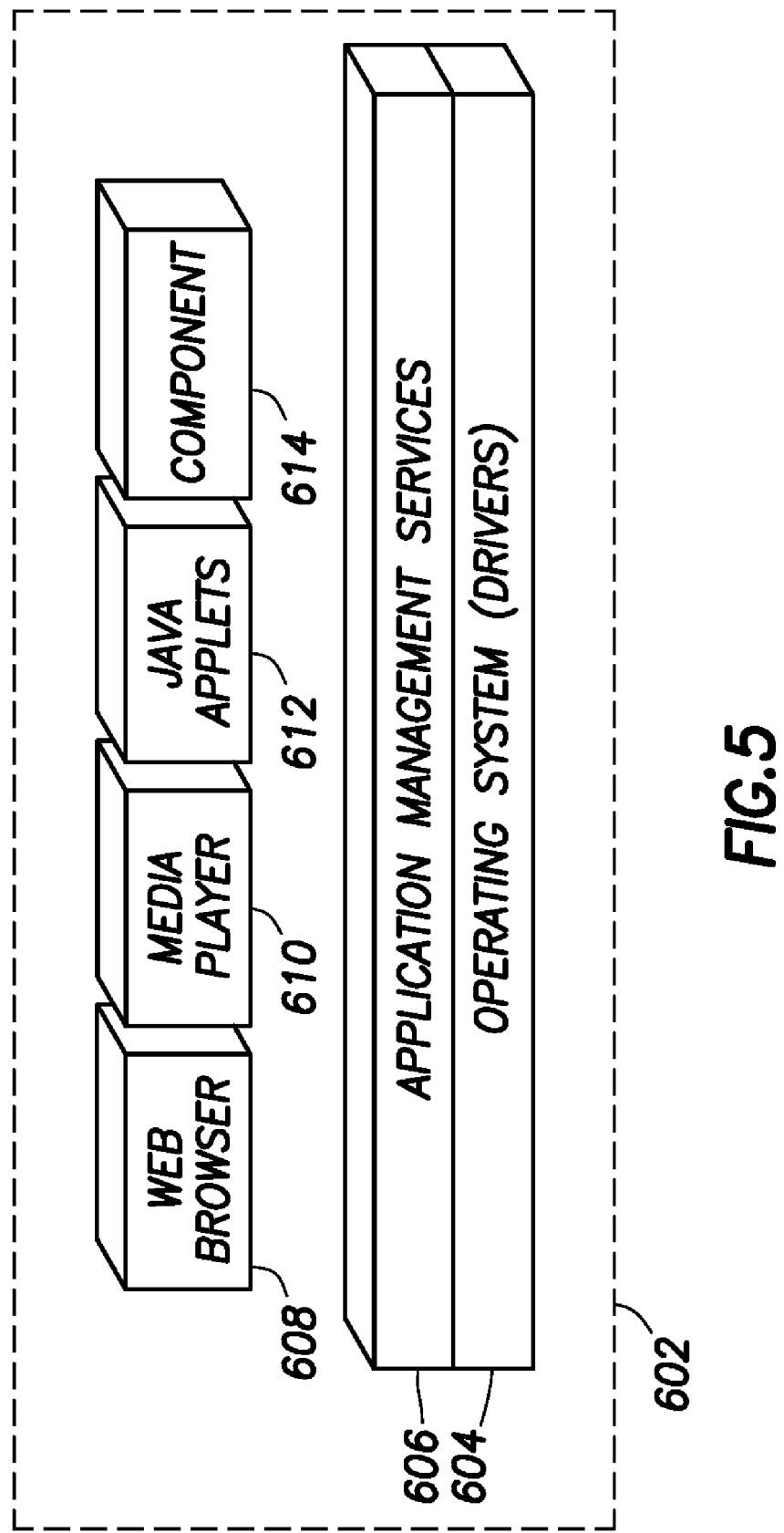
FIG. 5 is a diagram of a software environment that may be implemented on a handset operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 10. Also shown in FIG. 5 are a web browser application 608, a media player application 610, and Java applets 612. The web browser application 608 configures the handset 10 to operate as a web browser, allowing a user to enter information into forms and select links to retrieve and view web pages. The media player application 610 configures the handset 10 to retrieve and play audio or audiovisual media. The Java applets 612 configure the handset 10 to provide games, utilities, and other functionality. A component 614 that manages the functioning of LCD button 40, LCD button 50, and/or LCD button 60 might also be part of the software environment 602. Due to power and cost constraints, especially on mobile devices, such as mobile handsets, using power and expending the cost for one or more buttons with display screens would typically not be considered. However, the present disclosure was the first to identify the user navigation benefits that can be achieved, such as when soft buttons include display screens, as well as the flexibility with which information may be changed, and that the screen may be used for advertising and other purposes.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A mobile device comprising:
    a main display screen;
    at least one button that includes a secondary display screen configured to provide a variable output and accept an input based upon an application running on the mobile device; and
    a processor configured to control the secondary display screen and change information displayed on the secondary display screen when the at least one button is pressed.

2. The mobile device of claim 1, wherein the secondary display screen is operable to display at least one of:
    static text information;
    dynamic text information;
    static graphical information; and
    dynamic graphical information.

3. The mobile device of claim 2, wherein the information displayed on the secondary display screen is related to at least one of:
    a web page displayed on the main display screen;
    an application executing on the handset; and
    a user preference.

4. The mobile device of claim 1, further comprising a plurality of buttons each having secondary display screens.

5. The mobile device of claim 1, wherein the at least one button is operable to function as soft button.

6. The mobile device of claim 1, wherein the at least one button is operable to display an advertisement and wherein pressing the at least one button causes an action related to the advertisement.

7. The mobile device of claim 6, wherein the action related to the advertisement is at least one of:
    navigation to a web site related to the advertisement; and
    dialing a telephone number related to the advertisement.

8. The mobile device of claim 6, wherein a sponsor of the advertisement provides compensation when the at least one button is pressed.

9. The mobile device of claim 1, wherein the secondary display screen is operable to display an animation.

10. The mobile device of claim 1, wherein the at least one button is operable to provide an indication to the user when the at least one button is pressed, the indication comprising at least one of:
    a change of image displayed on the at least one button;
    a vibration of the at least one button; and
    a change of color of the at least one button.

11. The mobile device of claim 1, further comprising at least one additional button that includes a second secondary display screen, the at least one button and the at least one additional button operable to simultaneously display separate portions of at least one of:
    a graphical image; and
    a text message.

12. The mobile device of claim 1, wherein the secondary display screen is a liquid crystal diode screen.

13. The mobile device of claim 1, wherein the mobile device is one of a wireless mobile handset, a personal digital assistant, a laptop computer, and a tablet computer.

14. A method for providing information on a mobile device, comprising:
    providing a keypad on the mobile device including a display screen on at least one button on the keypad;
    displaying a variable output on the display screen on the button based upon an application running on the mobile device;
    performing a function based upon the application running on the mobile device in response to receiving an input on the button; and changing the information displayed on the secondary display screen when the at least one button is pressed.

15. The method of claim 14, further comprising displaying on the display screen at least one of
   static text information;
   dynamic text information;
   static graphical information; and
   dynamic graphical information.

16. The method of claim 15, wherein the display screen is a liquid crystal diode screen and wherein the mobile device is further defined as a mobile handset.

17. The method of claim 14, further comprising displaying an animation on the display screen on the button.

18. The method of claim 14, further comprising:
   displaying an advertisement on the display screen of the button; and
   a sponsor of the advertisement providing compensation based on the button being pressed.

19. A display system, comprising:
   a display screen coupled on a button on a keypad of a mobile device, the display screen configured to provide a variable output and accept an input based upon an application running on the mobile device; and
   a processor configured to control the secondary display screen and change the information displayed on the secondary display screen when the at least one button is pressed.

20. The display system of claim 19, wherein the button is one of a mechanical button, a capacitive button, and a touch sensitive button.

* * * * *